(12) United States Patent
Rische et al.

(10) Patent No.: US 7,037,590 B2
(45) Date of Patent: May 2, 2006

(54) WATER VAPOR-PERMEABLE COATING COMPOSITE

(75) Inventors: Thorsten Rische, Unna (DE);
Tillmann Hassel, Pulheim (DE);
Jürgen Meixner, Krefeld (DE);
Detlef-Ingo Schütze, Odenthal (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/285,749

(22) Filed: Nov. 1, 2002

(65) Prior Publication Data

US 2003/0138640 A1 Jul. 24, 2003

(30) Foreign Application Priority Data

Nov. 6, 2001 (DE) ............................... 101 53 950

(51) Int. Cl.
*B32B 13/04* (2006.01)

(52) U.S. Cl. ...................... 428/446; 428/426; 428/428; 428/441; 428/461; 428/462; 428/323; 428/331; 428/521; 428/522; 428/573.1; 428/537.5; 428/442; 428/913; 428/904; 428/500; 524/493; 524/556; 524/571

(58) Field of Classification Search ................ 428/446, 428/426, 428, 441, 461–462, 323, 331, 500, 428/521, 522, 573.1, 537.5, 442, 913, 904, 428/457; 524/493, 556, 571
See application file for complete search history.

(56) References Cited

U.S. PATENT DOCUMENTS

| 3,996,181 | A | * | 12/1976 | Hayashi et al. ................ 524/25 |
| 5,258,424 | A | | 11/1993 | Yagi et al. ................... 523/221 |
| 5,879,793 | A | | 3/1999 | Kummermehr et al. ..... 428/306 |
| 6,228,480 | B1 | * | 5/2001 | Kimura et al. .............. 428/328 |
| 6,548,149 | B1 | * | 4/2003 | Liu et al. .................... 156/235 |

FOREIGN PATENT DOCUMENTS

| DE | 10015600 | 10/2001 |
| EP | 0976866 | 2/2000 |
| EP | 1178150 | 2/2002 |
| GB | 1447223 | 8/1976 |
| JP | 60-11503 | 1/1985 |

OTHER PUBLICATIONS

Database WPI Section CH, Week 198326 Derwent Publications Ltd., London, GB; Class L03., AN 1983-62473K XP002266071 & JP 58 084938A (Sumitomo Electric Ind Co) May 21, 1983 *Zusammenfassung*.
Japanese Patent Abstracts (Examined) Section Ch, Week 199243 Derwent Publications Ltd. London GB; Class A18, AN 1992-353599 XP002266072 & JP 04 255767 A (Nippon Kenkyusho KK) Sep. 10, 1992 *Zusammenfassung*.

* cited by examiner

*Primary Examiner*—Ling Xu
(74) *Attorney, Agent, or Firm*—Joseph C. Gil; Thomas W. Roy

(57) ABSTRACT

The present invention relates to a water vapor-permeable coating composite containing one or more flexible substrates, which are coated on one or both sides with one or more identical or different coating compositions, provided that at least one coating composition contains, as binder, a silica sol-modified aqueous polymer dispersion prepared from unsaturated monomers.

10 Claims, No Drawings

WATER VAPOR-PERMEABLE COATING COMPOSITE

FIELD OF THE INVENTION

The present invention relates to a water vapor-permeable coating composite built up from coatings containing silica sol-modified aqueous polymer dispersions and flexible substrates, in particular for textile and leather applications.

BACKGROUND OF THE INVENTION

Aqueous systems are increasingly used for the coating of textiles and leather. The requirements that such coating systems have to meet include a good resistance to chemicals and water, a high mechanical load capacity as well as a high tensile strength and tear resistance combined with good adhesion. These requirements are largely met by polymer dispersions built up from monomers that contain at least one double bond, such as polyacrylate and polybutadiene dispersions. The various possibilities of producing such dispersions have been summarized, for example, by B. Vollmert in a review article ("Grundriss der Makromolekularen Chemie", Vol. 1, p.44 ff, Vollmert Verlag 1988, Karlsruhe).

JP-A 60011503 describes the use of 0.1 to 4 wt. % of silica sol in aqueous polymer dispersions built up from monomers containing double bonds, in the presence of an anionic surfactant, to provide an improved adhesion and solvent resistance of paints.

Aqueous polyacrylate dispersions with hydrophilic inorganic or organic microparticles, preferably polyacrylate particles, are disclosed in U.S. Pat. No. 5,258,424. Silica sols are employed as inorganic microparticles. These coating compositions are used to coat concrete surfaces. However, the silica sol-modified polyacrylates disclosed in U.S. Pat. No. 5,258,424 have only very low water vapor permeabilities.

In the textile and leather coating sector no water vapor-permeable polyacrylate and polybutadiene dispersions are known that exhibit significantly high water vapor permeabilities in combination with the property profile mentioned above.

It is an object of the present invention to provide a water vapor-permeable coating composite, in particular for textile and leather coating, that exhibits the required mechanical and chemical properties and also has a high water vapor permeability.

It has now been found that flexible substrates, such as leather and textiles, can be coated with the aid of aqueous polymer dispersions built up from unsaturated monomers, such as polyacrylate and polybutadiene dispersions, in combination with silica sols as binders. The resulting coating composite has a significantly improved water vapor permeability.

SUMMARY OF THE INVENTION

The present invention relates to a water vapor-permeable coating composite containing one or more flexible substrates, which are coated on one or both sides with one or more identical or different coating compositions, provided that at least one coating composition contains, as binder, a silica sol-modified aqueous polymer dispersion prepared from unsaturated monomers.

DETAILED DESCRIPTION OF THE INVENTION

The silica sol-modified aqueous polymer dispersions used in the coating composite according to the invention preferably contain A) 40 to 95 wt. %, preferably 50 to 90 wt. % and more preferably 60 to 85 wt. % of an aqueous polymer dispersion prepared from unsaturated monomers, and B) 5 to 60 wt. %, preferably 10 to 50 wt. % and more preferably 15 to 40 wt. % of a silica sol dispersion, wherein the percentages of A) and B) are based on total solids and add up to 100 wt. %.

Aqueous polymer dispersions A) used in the composites according to the invention preferably have a resin solids content of 20 to 60%, more preferably 30 to 50%.

All known aqueous polymer dispersions prepared from unsaturated monomers, such as polyacrylate dispersions and/or polybutadiene dispersions, are suitable for the component A). Monomers containing hydroxyl groups, "acidic" monomers, or monomers that contain neither acidic nor OH groups, are suitable. It is also possible to employ mixtures of the aforementioned monomers.

Suitable hydroxyl group-containing monomers include hydroxyalkyl esters of acrylic acid or methacrylic acid, preferably with 2 to 4 carbon atoms in the alkyl radical, such as 2-hydroxyethyl acrylate, 2-hydroxyethyl methacrylate, 2- or 3-hydroxypropyl acrylate and methacrylate, the isomeric hydroxybutyl acrylates and methacrylates and mixtures of these monomers.

Suitable "acidic" comonomers include olefinically unsaturated, polymerizable compounds that contain at least one carboxyl group and/or sulfonic acid group, such as olefinically unsaturated monocarboxylic or dicarboxylic acids having a molecular weight of 72 to 207. Examples include acrylic acid, methacrylic acid, maleic acid, itaconic acid and olefinically unsaturated compounds containing sulfonic acid groups, for example, 2-acrylamido-2-methylpropanesulfonic acid and mixtures of these olefinically unsaturated acids.

A third group of olefinically unsaturated monomers that may be jointly used in the production of the copolymers include olefinically unsaturated compounds that do not contain either acidic groups or hydroxyl groups. Examples include esters of acrylic acid or methacrylic acid with 1 to 18, preferably 1 to 8 carbon atoms in the alcohol radical, such as methyl acrylate, ethyl acrylate, isopropyl acrylate, n-propyl acrylate, n-butyl acrylate, 2-ethylhexyl acrylate, isobornyl acrylate, n-stearyl acrylate, the methacrylates corresponding to these acrylates, styrene, alkyl-substituted styrenes, butadiene, isoprene, acrylonitrile, methacrylonitrile, vinyl acetate, vinyl stearate, and mixtures of these monomers. Comonomers containing epoxy groups, such as glycidyl acrylate or methacrylate, or monomers, such as N-methoxymeth-acrylamide or N-methacrylamide, may also be used in minor amounts.

The production of aqueous polymer dispersions (A) is carried out according to known free-radical polymerization methods, for example, solution polymerization, emulsion polymerization and suspension polymerization. The process of free-radical emulsion polymerization in an aqueous medium is preferred.

Continuous or discontinuous polymerization processes may be used. Examples of discontinuous processes are the batch process and feed process, the latter being preferred. In the feed process water is added alone or with part of the anionic emulsifier and optionally a non-ionic emulsifier, as well as with part of the monomer mixture, and is heated to the polymerization temperature. In the case of a monomer addition the polymerization is started by free radicals and the remaining monomer mixture is metered in together with an initiator mixture and the emulsifier over a period of 1 to 10 hours, preferably 3 to 6 hours. If necessary, the reaction mixture is then post-activated in order to carry out the polymerization to a conversion of at least 99%.

The emulsifiers used are may be anionic and/or non-ionic. Anionic emulsifiers are those containing carboxylate, sulfate, sulfonate, phosphate or phosphonate groups. Emulsifiers are preferred that contain sulfate, sulfonate, phosphate or phosphonate groups. The emulsifiers may have a low molecular weight or high molecular weight. The latter are described, for example, in DE-A 3 806 066 and DE-A 1 953 349.

Preferred anionic emulsifiers are those that are built up from long-chain alcohols or substituted phenols and a polyether chain bonded to the hydroxyl group containing 2 to 100 ethylene oxide units as well as a sulfuric acid or phosphoric acid group bonded in the form of an ester unit. Ammonia or amines are preferred neutralizing agents for the unesterified acid groups. The emulsifiers may be added to the emulsion batch individually or as mixtures.

Suitable as non-ionic emulsifiers, which may be used in combination with the anionic emulsifiers, are reaction products of aliphatic, araliphatic, cycloaliphatic or aromatic carboxylic acids, alcohols, phenol derivatives and/or amines with epoxides, such as ethylene oxide. Examples include reaction products of ethylene oxide with castor oil carboxylic acids and abietic acid; with long-chain alcohols such as oleyl alcohol, lauryl alcohol, stearyl alcohol; with phenol derivatives such as substituted benzyl phenols, phenyl phenols and nonyl phenols; and with long-chain amines such as dodecylamine and stearylamine. The reaction products with ethylene oxide include oligoethers and/or polyethers with degrees of polymerization of 2 to 100, preferably 5 to 50.

These emulsifiers are added in amounts of 0.1 to 10 wt. %, based on the mixture of the monomers. Suitable co-solvents include water-soluble as well as water-insoluble solvents. Suitable co-solvents include aromatic compounds such as benzene, toluene, xylene and chlorobenzene; esters such as ethyl acetate, butyl acetate, methyl glycol acetate, ethyl glycol acetate and methoxypropyl acetate; ethers such as butyl glycol, tetrahydrofuran, dioxane, ethyl glycol ether and ethers of diglycol; ketones such as acetone, methyl ethyl ketone, methyl isobutyl ketone; trichloromonofluoroethane; and cyclic amides such as N-methyl-pyrrolidone and N-methylcaprolactam.

The free radical-initiated polymerization may be started by water-soluble and water-insoluble initiators or initiator systems whose radical decomposition half-lives at temperatures from 10° C. to 100° C. are 0.5 sec. to 7 hours.

In general the polymerization is carried out in aqueous emulsion in the aforementioned temperature range, prefer ably between 30° C. and 90° C., under a pressure of $10^3$ to $2 \times 10^4$ mbar. The exact polymerization temperature is determined according to the type of initiator. The initiators are used in amounts of 0.05 to 6 wt. %, based on the total amount of monomers.

Suitable initiators include water-soluble and water-insoluble azo compounds such as azoisobutyrodinitrile or 4,4'-azo-bis-(4-cyanopentanoic acid); inorganic and organic peroxides such as dibenzoyl peroxide, t-butyl perpivalate, t-butyl-per-2-ethylhexanoate, t-butyl perbenzoate, t-butyl hydroperoxide, di-t-butyl peroxide, cumene hydroperoxide, dicyclohexyl dicarbonate, dibenzyl peroxydicarbonate, the sodium, potassium and ammonium salts of peroxodisulfuric acid, and hydrogen peroxide. The peroxodisulfates and hydrogen peroxides may be used in combination with reducing agents, such as the sodium salt of formamidinesulfinic acid, ascorbic acid or polyalkylene polyamines. A significant reduction of the polymerization temperature is generally thereby achieved.

In order to regulate the molecular weight of the polymers conventional regulators may be used, such as n-dodecylmercaptan, t-dodecylmercaptan, diisopropyl xanthogene disulfide, di(methylene-trimethylolpropane)xanthogene disulfide and thioglycol. The regulators are added in amounts of at most 3 wt. %, based on the monomer mixture.

If necessary after the end of the polymerization reaction, neutralizing agents are added to the polymers present in aqueous dispersion to obtain a degree of neutralization of 30 to 100%, preferably 50 to 100%. Inorganic bases, ammonia or amines are added as neutralizing agents. Examples include inorganic bases, such as sodium hydroxide and potassium hydroxide; and amines such as ammonia, trimethylamine, triethylamine, dimethylethanolamine, methyldiethanolamine and triethanolamine. The neutralizing agents may be used in substoichiometric or excess stoichiometric amounts, which results in the aforementioned contents of sulfonate and/or carboxylate groups, in particular carboxylate groups and the aforementioned acid numbers.

When there is complete neutralization of the acidic groups that may optionally be present, the result is an acid number of zero, such that the content of sulfonate and/or carboxylate groups corresponds to the original content of sulfonic acid groups and/or carboxyl groups. With partial neutralization the content of sulfonate and/or carboxylate groups corresponds to the amount of neutralizing agent that is employed. The resulting aqueous dispersions have the aforementioned concentrations and viscosities. The optional co-solvents may remain in the aforementioned amounts in the aqueous dispersion or may be removed by distillation after the polymerization reaction.

Preferred aqueous polymer dispersions A) are the polyacrylate dispersions and/or polybutadiene dispersions that are known to be suitable for coating flexible substrates, in particular textile and leather coating, such as polyacrylate dispersions Nos. 1 to 25 (see Table 1). Preferred polybutadiene dispersions also include Euderm®-Resin40B and Euderm®-Resin50B (see Table 1, dispersions Nos. 26–27). The chemical and physical properties of the dispersions are given in Table 1, where possible.

TABLE 1

Polyacrylate dispersions and/or polybutadiene dispersions

| Name* | No. | Solids [%] | Shore A Hardness | pH | $T_g$ [° C.] | Modulus (100%) [psi] | Tensile Strength [psi] | Elongation at Break |
|---|---|---|---|---|---|---|---|---|
| Primal ® ST-57 | 1 | 35 | 80 | 8–9 | 22 | 1368 | 2407 | 325 |
| Primal ® ST-59 | 2 | 35 | 67 | 7.7–9 | −10 | 272 | 660 | 1130 |
| Primal ® ST-89 | 3 | 38 | 58 | 8–9 | −29 | 267 | 294 | 1040 |
| Primal ® HPB-980 | 4 | 36 | 54 | 8–9 | 12 | 137 | 1652 | 650 |
| Primal ® HPB-971 | 5 | 36 | 36 | 7–9 | 6–7 | 78 | 494 | 875 |
| Primal ® HPB-985 | 6 | 48 | 24 | 6.5–7.5 | −11 | — | 194 | 775 |
| Primal ® E-32NP | 7 | 46 | 34 | 2–3 | 0 | 68 | 350 | 710 |
| Primal ® ST-28 | 8 | 35 | 40 | 8–9 | −9 | 153 | 304 | 1995 |
| Primal ® Bottom 45A | 9 | 40 | 45 | 4–6 | 3 | 60 | 649 | 720 |
| Primal ® FGR | 10 | 23 | — | 7–9 | −8 | — | — | — |
| Primal ® 826 | 11 | 35 | 30–35 | 3.9–4.5 | 8 | 182 | 1275 | 630 |
| Primal ® 863 | 12 | 35 | 30 | 5.2–5.8 | −7 | 31 | 172 | 970 |
| Primal ® 892 | 13 | 36 | 30–35 | 5–6 | −14 | 28 | 50 | 2500 |
| Primal ® Compact B | 14 | 35 | 30 | 5–6 | — | 25 | — | 900 |
| Primal ® Bottom 32A | 15 | 35 | 32 | 4 | −5 | 46 | 239 | 1200 |
| Primal ® SB-200 | 16 | 35 | 64 | 7–8 | −6 | 365 | 1550 | 680 |
| Primal ® LT-76 | 17 | 40 | 30 | 3.8–4.4 | 5 | 68 | 327 | 605 |
| Primal ® LT-87 | 18 | 46 | 28 | 6–7 | −12 | 18 | 871 | 1915 |
| Primal ® Bottom 25A | 19 | 40 | 25 | 5 | −8 | 45 | 450 | 1140 |
| Primal ® SB-150 | 20 | 35 | 44 | 7–8 | −8 | 132 | 899 | 760 |
| Primal ® SB-100 | 21 | 35 | 29 | 7–8 | −10 | 68 | 408 | 965 |
| Primal ® Prebottom VE | 22 | 39 | — | 5 | — | — | — | — |
| Primal ® ST-84 | 23 | 37–38 | 54 | 7–9 | −17 | 995 | 335 | 940 |
| Primal ® SB-300 | 24 | 35 | 50 | 8–9 | −40 | 235 | 845 | 730 |
| Hydrolac ® AQUEOUS-S | 25 | 38 | 70–75 | 8–9 | — | — | — | — |
| Euderm ® Resin 40B | 26 | 40 | 40 | 5–6 | −11 | 74 | 145 | >1800 |
| Euderm ® Resin 50B | 27 | 40 | 50 | 5–6 | −2 | 82 | 160 | 870 |

*Products 1 to 25 are available from Rohm and Hass, Philadelphia, Pa., USA, and products 26 and 27 are available from Bayer AG, Leverkusen, Germany.

Especially preferred are Primal® HPB 971, Primal® Bottom 32 A, Primal® SB 100, Primal® SB 150, Primal® SB 200 and Primal® SB 300 (see Table 1).

Suitable silica sols B) include colloidal solutions of amorphous silicon dioxide in water. They can be obtained by neutralizing waterglass, such as described, for example, in Ullmanns Encyklopadie der technischen Chemie, Vol.21, 4$^{th}$ Edition, Verlag Chemie, Weinheim, 1982, Chapter 5, p. 456 ff. Silica sols are commercially available for example under the trade names Levasil® (Bayer AG, Leverkusen, Germany), Ludox® (DuPont, USA), Nalcoag® (Nalco Chemical, USA) and Snowtex® (Nissan, Japan). The $SiO_2$ particles have diameters between 1 and 150 nm. Preferred silica sols are those whose $SiO_2$ particles have a diameter of 5 to 100 nm. More preferred are silica sols with a mean $SiO_2$ particle diameter of 7 to 50 nm. Silica sols may be adjusted to be basic (pH>7) as well as acidic (pH<7). The solids content of silica sols is preferably 1 to 60%, more preferably 20 to 50% and most preferably 25 to 45%.

The silica sol-modified aqueous binders contained in the coating composites according to the invention may be produced by mixing polymer dispersion A) and silica sol B) according to known mixing techniques. The emulsion polymerization may be carried out before or after the modification with silica sols. It is preferred to incorporate the silica sols before and during the emulsion polymerization. The polymer synthesised by a solution, emulsion or suspension polymerization is produced for this purpose in the silica sol or a silica sol/water mixture instead of pure water.

The silica sol-modified aqueous polymer dispersions can be stored and transported and may be processed at any suitable later time. Depending on the chosen chemical composition of the polymer and the content of silica sol, coatings with different properties are obtained. For example, soft tacky layers and thermoplastic and rubber-elastic products of widely varying degrees of hardness up to glass-hard thermosetting plastics may be obtained.

The coating compositions used in the coating composites according to the invention may contain, in addition to the aqueous silica sol-modified polymer dispersions as binders, the known additives from coatings technology, such as non-ionic and/or anionic thickening agents, fillers, pigments, waxes, handling agents, colorants, solvents, flow improvers and crosslinking agents.

The substrates used for the water vapor-permeable coating composites according to the invention are flexible and include wood, metal, plastics, paper, leather, textiles, felt, glass and glass fibers. Preferred substrates are woven and non-woven textiles and leather.

For the production of the water vapor-permeable composite, one or more flexible substrate(s) is either coated, overlaid or impregnated on one or both sides with one or more coating composition(s), which may be identical or different, provided that at least one coating composition contains the silica sol-modified aqueous polymer dispersions according to the invention.

In this connection the aqueous silica sol-modified dispersions may optionally be adjusted to a coating viscosity with a commercially available thickening agent and, if necessary, further additives may optionally be added.

The application of the coating compositions to the substrate may be carried out by known methods, for example, by brushing, casting, knife coating, spraying, rolling, printing or dipping. The coating may be dried at room temperature or elevated temperature, e.g., by stoving at up to 200° C.

When applying the coating compositions one or more coats are applied in succession so that the total thickness of primer coating and cover layer is 10 to 100 μm, preferably 20 to 60 μm. A paste that dries to form a microporous layer may also be used as primer as described in DE-A 2 020 153. The subsequently applied cover layer protects the coating composite according to the invention and substrate against mechanical stress and abrasion.

The application of the primer coating and cover layer to the substrate may also be performed by the so-called reverse process. In this process the cover layer is initially applied to a separation carrier and dried. After the application of the primer coat or adhesive coat the substrate is gently pressed into the still moist layer. After drying, a solid composite of coating and substrate is formed that is removed from the separation layer. The structure of the composite essentially corresponds to the direct coating described above.

In the coating composite according to the invention at least one coating composition contains the aqueous silica sol-modified binders. It is also possible, however, to use other binders, such as polyurethane dispersions, preferably those that are permeable to water vapor. In order to ensure transportation of water vapor through the coating composite according to the invention is as unimpeded as possible, it is convenient if all the coatings of the overall composite are permeable to water vapor.

In a preferred embodiment all of the coating compositions of the coating composite according to the invention contain the aqueous silica sol-modified polymer dispersions prepared from unsaturated monomers.

The resulting water vapor permeability of the coating composite according to the invention leads, in particular with textiles and leather, to a significantly improved wearing comfort for the end user compared to the conventional non-water vapor-permeable coatings of the prior art.

EXAMPLES

Substances Employed:
A. Primal® SB 150 (Rohm and Haas, Philadelphia, Pa., USA): 35% polyacrylate dispersion having the following properties: tensile strength: 6.2 MPa; elongation at break: 760%
B. Euderm® Resin 50B: 40% polybutadiene dispersion having the following properties: tensile strength: 11.6 MPa; elongation at break: 870%
C. Levasil® 100/30 (Bayer AG, Leverkusen, Germany): 30% anionic silica sol dispersion having the following properties: specific surface: 100 $m^2/g$; mean particle size: 30 nm; pH=10.
D. Levasil® 200/30 (Bayer AG, Leverkusen, Germany): 30% anionic silica sol dispersion having the following properties: specific surface: 200 $m^2/g$; mean particle size: 15 nm; pH=9.
E. Levasil® 300/30 (Bayer AG, Leverkusen, Germany): 30% anionic silica sol dispersion having the following properties: specific surface: 300 $m^2/g$; mean particle size: 9 nm; pH=10.
F. Levasil® VP AC 4038 (Bayer AG, Leverkusen, Germany): 30% anionic silica sol dispersion having the following properties: specific surface: 200 $m^2/g$; mean particle size: 15 nm; pH=9.
G. Levasil® 9 50/50 (Bayer AG, Leverkusen, Germany): 30% anionic silica sol dispersion having the following properties: specific surface: 50 $m^2/g$; mean particle size: 50 nm; pH=9.
H. Levasil® 200S/30 (Bayer AG, Leverkusen, Germany): 30% anionic silica sol dispersion having the following properties: specific surface: 200 $m^2/g$; mean particle size: 15 nm; pH=4.

Silica Sol-Modified Polymer Dispersions Employed

1.) Silica Sol-Modified Polymer Dispersion (POLY 1)

81.5 g of polymer dispersion A were placed in a reaction vessel equipped with stirrer, dropping funnel and reflux condenser, and 10.0 g of silica sol dispersion G were added dropwise within 10 minutes while stirring. The reaction mixture was then stirred for a further 30 minutes at room temperature.

2.) Silica Sol-Modified Polymer Dispersion (POLY 2)

Procedure analogous to 1.), except that 80.0 g of polymer dispersion A and 16.2 g of silica sol dispersion C were used.

3.) Silica Sol-Modified Polymer Dispersion (POLY 3)

Procedure analogous to 1.), except that 79.2 g of polymer dispersion A and 16.0 g of silica sol dispersion D were used.

4.) Silica Sol-Modified Polymer Dispersion (POLY 4)

Procedure analogous to 1.), except that 80.0 g of polymer dispersion A and 16.2 g of silica sol dispersion E were used.

5.) Silica Sol-Modified Polymer Dispersion (POLY 5)

Procedure analogous to 1.), except that 80.0 g of polymer dispersion A and 16.1 g of silica sol dispersion F were used.

6.) Silica Sol-Modified Polymer Dispersion (POLY 6)

Procedure analogous to 1.), except that 800.0 g of polymer dispersion A and 200.0 g of silica sol dispersion C were used.

7.) Silica Sol-Modified Polymer Dispersion (POLY 7)

Procedure analogous to 1.), except that 1500.0 g of polymer dispersion A and 500.0 g of silica sol dispersion C were used.

8.) Silica Sol-Modified Polymer Dispersion (POLY 8)

Procedure analogous to 1.), except that 1333.4 g of polymer dispersion A and 666.6 g of silica sol dispersion C were used.

9.) Silica Sol-Modified Polymer Dispersion (POLY 9)

Procedure analogous to 1.), except that 500.0 g of polymer dispersion A and 500.0 g of silica sol dispersion C were used.

10.) Silica Sol-Modified Polymer Dispersion (POLY 10)

Procedure analogous to 1.), except that 45.0 g of polymer dispersion B and 6.2 g of silica sol dispersion G were used.

11.) Silica Sol-Modified Polymer Dispersion (POLY 11)

Procedure analogous to 1.), except that 39.9 g of polymer dispersion B and 9.1 g of silica sol dispersion C were used.

12.) Silica Sol-Modified Polymer Dispersion (POLY 12)

Procedure analogous to 1.), except that 39.0 g of polymer dispersion B and 8.8 g of silica sol dispersion D were used.

13.) Silica Sol-Modified Polymer Dispersion (POLY 13)

Procedure analogous to 1.), except that 39.9 g of polymer dispersion B and 9.0 g of silica sol dispersion F were used.

14.) Silica Sol-Modified Polymer Dispersion (POLY 14)

Procedure analogous to 1.), except that 39.1 g of polymer dispersion B and 9.0 g of silica sol dispersion H were used.

15.) Silica Sol-Modified Polymer Dispersion (POLY 15)

Procedure analogous to 1.), except that 1600.0 g of polymer dispersion B and 400.0 g of silica sol dispersion C were used.

16.) Silica Sol-Modified Polymer Dispersion (POLY 16)

Procedure analogous to 1.), except that 1500.0 g of polymer dispersion B and 500.0 g of silica sol dispersion C were used.

17.) Silica Sol-Modified Polymer Dispersion (POLY 17)

Procedure analogous to 1.), except that 1333.4 g of polymer dispersion B and 666.6 g of silica sol dispersion C were used.

18.) Silica Sol-Modified Polymer Dispersion (POLY 18)

751.9 g of polymer dispersion B and 248.1 g of distilled water were placed in a reaction vessel equipped with stirrer, dropping funnel and reflux condenser, and 1000.0 g of silica sol dispersion C were added dropwise within 10 minutes while stirring. The reaction mixture was then stirred for a further 30 minutes at room temperature.

Application Technology Part:

Production According to the Invention of Water Vapor-permeable Coating Composites Textiles:

The property spectrum of the coating composites produced according to the invention was determined in the form of the free films used for coating textile materials.

The Films were Produced as Follows:

In a film drawing apparatus containing two polished rollers that can be adjusted to an accurate interspacing, a release paper was fed in front of the rear roller. The spacing between the paper and the front roller was adjusted by means of a feeler gauge. This spacing corresponded to the film thickness (wet) of the resultant coating, and can be adjusted to the desired thickness of each coat. The coating can also be applied consecutively in several coats.

In order to apply the individual coats, the products (aqueous binders were previously adjusted to a viscosity of 4500 mPa·s by adding ammonia/polyacrylic acid) were poured onto the gap between the paper and front roller and the release paper was removed by pulling vertically downwards, resulting in the formation of the corresponding film on the paper. If several coats were to be applied, each individual coat was dried and the release paper was reinserted on each occasion.

The determination of the 100% modulus was carried out according to DIN 53504 on films having a thickness of greater than 100 μm.

The degree of swelling was calculated after storage for two hours in ethyl acetate, acetone and toluene by difference measurements of length and width.

The water vapor permeabilities (WVP) were measured according to the protocol defined in technical leaflet DS 2109 TMI published by British Textile Technology Group, Manchester, England.

The determination of the mean particle sizes (the mean figure was given) of the polymer dispersions was carried out by means of laser correlation spectroscopy measurements (apparatus from Malvern Zetasizer 1000, Malver Inst. Limited) of the relevant dispersion.

TABLE 2

Polymer dispersion A (polyacrylate dispersion)/silica sol mixtures with different silica sol types

|  | A | POLY 1 | POLY 2 | POLY 3 | POLY 4 | POLY 5 |
|---|---|---|---|---|---|---|
| Solids content [wt. %] | 35.6 | 37.3 | 34.8 | 34.8 | 34.8 | 34.8 |
| pH Value | 7.36 | 7.24 | 7.30 | 7.26 | 7.43 | 7.34 |
| Silica sol | — | G | C | D | E | F |
| $SiO_2$ content w.r.t. solids [%] | 0 | 15.0 | 15.0 | 15.0 | 15.0 | 15.0 |
| Mean particle size [nm] | 73.3 | 78.9 | 80.9 | 85.1 | 83.4 | 97.6 |

The results in Table 2 confirm that a large number of different types of silica sols can be used.

TABLE 3

Polymer dispersion A (polyacrylate dispersion)/silica sol C mixtures with different silica sol fractions

|  | A | POLY 6 | POLY 7 | POLY 8 | POLY 9 |
|---|---|---|---|---|---|
| Solids content [wt. %] | 35.6 | 34.1 | 33.7 | 33.5 | 32.9 |
| pH Value | 7.36 | 7.64 | 7.61 | 7.62 | 7.88 |
| $SiO_2$ content w.r.t. solids [%] | — | 17.0 | 22.0 | 28.0 | 45.0 |
| Mean particle size [nm] | 73.3 | 75.3 | 82.0 | 80.3 | 80.9 |
| Modulus (100%) | 0.7 | 2.3 | 3.0 | 4.4 | 8.0 |
| Tensile strength [MPa] | 8.4 | 12.2 | 10.8 | 9.2 | 10.5 |
| Elongation at break [%] | 730 | 590 | 500 | 350 | 250 |
| Swelling in ethyl acetate [%] | 955 | 342 | 280 | 266 | 91 |
| Swelling in acetone [%] | 1139 | 463 | 463 | 284 | 195 |
| Swelling in toluene [%] | 904 | 463 | 337 | 284 | 237 |
| Water vapor permeability [g/m²d] | 3313 | 11957 | 18119 | 19749 | 17937 |

The results shown in Table 3 confirm that with increasing silica sol concentration, a significantly improved resistance to chemicals as well as a significantly improved water vapor permeability were obtained compared to the unmodified polyacrylate dispersion A.

TABLE 4

Polymer dispersion B (polybutadiene dispersion)/silica sol mixtures with different silica sol types

|  | B | POLY 10 | POLY 11 | POLY 12 | POLY 13 | POLY 14 |
|---|---|---|---|---|---|---|
| Solids content [wt. %] | 39.9 | 40.1 | 38.4 | 38.5 | 37.0 | 38.5 |
| pH Value | 6.37 | 6.61 | 7.07 | 7.16 | 4.41 | 7.78 |
| Silica sol | — | G | C | D | H | F |
| $SiO_2$ content w.r.t. solids [%] | — | 15.0 | 15.0 | 15.0 | 15.0 | 15.0 |
| Mean particle size [nm] | 73.6 | 73.4 | 73.3 | 106.3 | 86.0 | 71.2 |

The results in Table 4 confirm that a large number of different types of silica sol can be used.

TABLE 5

Polymer dispersion B (polybutadiene dispersion)/silica sol C mixtures with different silica sol fractions

|  | B | POLY 15 | POLY 16 | POLY 17 | POLY 18 |
|---|---|---|---|---|---|
| Solids content [wt. %] | 39.9 | 37.9 | 37.6 | 37.5 | 30.8 |
| pH Value | 6.29 | 7.12 | 7.33 | 7.70 | 8.50 |
| $SiO_2$ content w.r.t. solids [%] | 0 | 16.3 | 20.6 | 28.0 | 50.9 |
| Mean particle size [nm] | 109.4 | 266.4 | 288.3 | 268.2 | 206.1 |
| Modulus (100%) | 1.1 | 1.3 | 2.1 | 2.8 | 5.3 |
| Tensile strength [MPa] | 11.6 | 6.4 | 13.6 | 12.4 | 11.5 |
| Elongation at break [%] | 870 | 600 | 730 | 630 | 540 |
| Swelling in ethyl acetate [%] | 392 | 295 | 252 | 200 | 187 |
| Swelling in acetone [%] | 1563 | 904 | 463 | 463 | 337 |
| Swelling in toluene [%] | 536 | 397 | 337 | 284 | 237 |
| Water vapor permeability [g/m²d] | 150 | 5400 | 1200 | 4000 | 14000 |

The results set forth in Table 5 confirm that with increasing silica sol concentration, a significantly improved resistance to chemicals as well as a significantly improved water vapor permeability were obtained compared to the unmodified polybutadiene dispersion B.

Leather:

1) Materials Employed:

A) Colorant:
   Commercially available aqueous carbon black formulation containing 26% carbon black and suspension agent B) Plasticizing filler:
   Aqueous formulation (20% dry content) of wool grease, starch and silicone C) Binder:
   Acrylates No. 5 and No. 15 (see Table 1)

D) Silica sol:
   Silica sol E

E) Miscellaneous:
   E 1) Commercially available matting agent containing 19% silicate and almost no binder.
   E 2) Commercially available organic nitro finish with 10% cellulose nitrate content, plasticized with dibutyl phthalate.

2) Formulations Used:

2.1) Pure binder formulation:
   A mixture was prepared containing 50 parts of colorant A), 180 parts of filler B), 60 parts of matting agent E1), 250 parts of acrylate 15 and 150 parts of acrylate 5. 50 parts of water were also added to the mixture.

2.2) Silica sol-modified formulation:
   The mixture was identical to mixture 2.1) with regard to colorant, filler and matting agent; however, only 175 parts of acrylate no. 15 and 105 parts of acrylate no. 5 (see Table 1) were used. 140 parts of silica sol E and 30 parts of water were mixed in.

The resultant mixture had a binder/silica sol ratio (ff) of 7:3. The solids fraction of binder plus silica sol in the mixture corresponded to the solids fraction of the acrylate binder in mixture 2.1).

For use the mixtures were in each case adjusted with an acrylate thickener to an outflow viscosity of 40 sec. (DIN beaker, 6 mm).

Both mixtures were applied to a full grain leather as follows:

| 1st application: | rollercoat with a screen roller, dry |
|---|---|
| 2nd application: | spray application to form a visibly wet coat, followed by drying and embossing (90° C., 250 bar, 3 sec.) |

After the embossing a further coat was applied by spraying and the whole was dried.

Finally the nitrofinish E2) was sprayed very thinly onto the dressing produced as above.

The water vapor permeability of the leathers produced above was determined according to EN 12991 after each dressing stage. The following table shows the results obtained.

TABLE 6

WVP results; dressing mixture 2.1 compared to dressing modified mixture 2.2 (measurement according to EN 12991)

| Dressing Step | WVP [mg cm$^{-2}$ h$^{-1}$] with formulation 2.1 | WVP [mg cm$^{-2}$ h$^{-1}$] with formulation 2.2 |
|---|---|---|
| Leather used | 18.1 | 18.1 |
| After rollercoat application | 7.7 | 8.0 |
| After spray application 1 | 3.8 | 5.5 |
| After embossing | 3.5 | 4.4 |
| After spray application 2 | 2.3 | 4.2 |
| After finishing | 2.0 | 3.9 |

The results clearly demonstrate the significant improvement in the water vapor permeability due to the silica sol modification.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A water vapor-permeable composite consisting essentially of a flexible substrate, which is coated on one or both sides with one or more identical or different coating compositions, provided that at least one coating composition contains, as binder, a silica sol-modified aqueous polymer dispersion comprising
   A) 40 to 95% by weight of an aqueous polybutadiene dispersion prepared from unsaturated monomers,
   B) 5 to 60% by weight of a silica sol dispersion (B), wherein the percentages of A) and B) are based on total solids and add up to 100 wt. %.

2. The composite of claim 1, wherein said silica sol-modified aqueous dispersion comprises from 50 to 90% by weight of component A) and from 10 to 50% by weight of component B).

3. The composite of claim 2, wherein said silica sol-modified aqueous dispersion comprises from 60 to 85% by weight of component A) and from 15 to 40% by weight of component B).

4. The composite of claim 1, wherein component A) has a resin solids content of from 20 to 60% by weight.

5. The composite of claim 4, wherein component A) has a resin solids content of from 30 to 50% by weight.

6. The composite of claim 1, wherein component B) has a solids content of from 1 to 60% by weight.

7. The composite of claim 6, wherein component B) has a solids content of from 20 to 50% by weight.

8. The composite of claim 7, wherein component B) has a solids content of from 25 to 45% by weight.

9. The composite of claim 1, wherein the flexible substrate is selected from the group consisting of wood, metal, plastic, paper, leather, textile, felt, glass and glass fiber.

10. The composite of claim 1 wherein the flexible substrate is a woven or non-woven textile or leather.

* * * * *